ved by examiner

(12) United States Patent
Fan et al.

(10) Patent No.: US 8,531,733 B2
(45) Date of Patent: Sep. 10, 2013

(54) IMAGE PROCESSING SYSTEM WITH ELECTRONIC BOOK READER MODE

(75) Inventors: Zhigang Fan, Webster, NY (US); Tonya L. Love, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 714 days.

(21) Appl. No.: 12/754,942

(22) Filed: Apr. 6, 2010

(65) Prior Publication Data

US 2011/0242610 A1   Oct. 6, 2011

(51) Int. Cl.
*H04N 1/4092* (2006.01)
*H04N 7/50* (2006.01)

(52) U.S. Cl.
USPC ............ 358/3.27; 358/19; 358/2.1; 358/1.15; 382/232

(58) Field of Classification Search
USPC .................. 715/246, 273, 526, 737, 745, 769
See application file for complete search history.

(56) References Cited

U.S. PATENT DOCUMENTS

| | | | |
|---|---|---|---|
| 6,594,401 B1 * | 7/2003 | Metcalfe et al. | 382/275 |
| 7,065,716 B1 * | 6/2006 | Rzepkowski et al. | 715/839 |
| 8,027,066 B2 * | 9/2011 | Li et al. | 358/3.27 |
| 8,254,630 B2 * | 8/2012 | Abe | 382/103 |
| 8,286,083 B2 * | 10/2012 | Barrus et al. | 715/745 |
| 2006/0244998 A1 | 11/2006 | Salgado | |
| 2009/0044130 A1 | 2/2009 | Saluja | |
| 2009/0148042 A1 | 6/2009 | Fan et al. | |
| 2010/0008581 A1 | 1/2010 | Bressan | |
| 2010/0033765 A1 | 2/2010 | Fan et al. | |

* cited by examiner

*Primary Examiner* — Steven Kau
(74) *Attorney, Agent, or Firm* — Fay Sharpe LLP

(57) ABSTRACT

An image processing system such as a multi-function device (MFD) with an "e-reader" mode is disclosed. The e-reader mode can be activated by a user from the MFD user interface, or automatically detected by the system if the mode is set to "auto." Once in e-reader mode, the system automatically locates the area corresponding to the e-reader screen, crops it, de-skews it when necessary, and enhances the image. In addition, N-Up (printing several pages of content on one physical page) may be applied if users desire. The enhancement adjusts background color, boosts the contrast, and de-blurs the image when necessary. Two embodiments of enhancement are presented. The first one performs Tone Reproduction Curve (TRC) adjustment and possible de-blurring on the entire screen area. The second one segments the screen area into three kinds of objects (text/picture/background). Different TRCs are applied to enhance the objects.

15 Claims, 9 Drawing Sheets

IMAGE PROCESSING SYSTEM WITH ELECTRONIC BOOK READER MODE

BACKGROUND

The methods and systems disclosed herein are related to the art of digital image processing.

By way of background, an e-book (short for electronic book), also known as a digital book, is an e-text that forms the digital media equivalent of a conventional printed book, sometimes restricted with a digital rights management system. E-books are usually read on dedicated hardware devices known as e-readers or e-book devices (e.g., Amazon Kindle or Sony Reader). Personal computers and some cell phones can also be used to read e-books.

The main advantages of the e-readers are portability, readability of screen in bright sunlight, and long battery life. Similar to the needs for copying pages from a paper book, users of the e-books may also occasionally feel the necessity for printing a few pages from an e-book, for the purposes of sharing, more easily carrying, or more comfortably reading.

Nevertheless, it is not easy to make a print from the existing e-readers. The existing e-readers on the market do not provide a printing function. To make a print, it is necessary to upload the file to a computer and then print from there. However, this may not be an easy task, either. One obstacle is the file format. As various file formats are used for different e-books, printing a file with a particular format may not always be supported.

In the case where an image processing system such as a multifunctional device (often referred to as an MFD or MFP) is easily accessible, directly copying (more specifically, placing the e-reader on top of the scanning platen and pushing the copy button) might be a simple solution for creating a few pages of hardcopy of an e-book.

An MFD is normally a product that provides many useful functions, such as: Photocopying, Network Printing, Scanning, Faxing, and Color Copying and Printing. Existing MFDs, however, are not designed for making copies of e-readers and the image quality is not likely to be optimal.

The exemplary embodiments disclosed herein contemplate new and improved methods and systems that resolve the above-referenced difficulties and others.

BRIEF DESCRIPTION

The exemplary embodiment relates to the addition of an "e-reader" mode, which can be activated by a user from the MFD user interface (UI), or automatically detected by the system if the mode is set to "auto." Once in "e-reader" mode, the system automatically locates the area corresponding to the e-reader screen, crops it, de-skews it when necessary, and enhances the image. In addition, N-Up (printing several pages of content on one physical page) may be applied if users desire. The enhancement adjusts background color, boosts the contrast, and de-blurs the image when necessary. Two embodiments of enhancement are presented. The first one performs Tone Reproduction Curve (TRC) adjustment and possible de-blurring on the entire screen area. The second one segments the screen area into three kinds of objects (text/picture/background). Different TRCs are applied to enhance the objects.

In one embodiment, a method of processing images from an electronic book reader with an image processing system is provided. The method includes: acquiring an input image from an electronic book reader via an image input device and forming an input image representation via an image processing controller. An electronic book reader screen is detected in the input image representation, whereby a region defining the electronic book reader screen is determined. The input image representation is cropped, whereby image content outside the region defining the electronic book reader screen is deleted or set to white. The cropped image of the electronic book reader screen is enhanced. Finally, the enhanced image of the electronic book reader screen is rendered via an output image device.

In another embodiment, a system for processing images from an electronic book reader is provided. The system includes an image input device that acquires an input image from an electronic book reader screen. The system also includes an image processing controller that forms an input image representation of the electronic book reader screen comprising a bitmap of pixels, detects an electronic book reader screen in the input image representation, whereby a region defining the electronic book reader screen is determined, crops the input image representation, whereby image content outside the region defining the electronic book reader screen is deleted or set to white, and enhances the cropped image of the electronic book reader screen. The system further includes an output image device that renders the enhanced image of the electronic book reader screen.

In yet another embodiment, a computer program product is provided. The computer program product is a computer-usable data carrier storing instructions that, when executed by a computer, cause the computer to perform a method comprising: acquiring an input image from an electronic book reader screen via an image input device; forming an input image representation of the electronic book reader screen comprising a bitmap of pixels via an image processing controller; detecting an electronic book reader screen in the input image representation, whereby a region defining the electronic book reader screen is determined; cropping the input image representation, whereby image content outside the region defining the electronic book reader screen is deleted or set to white; enhancing the cropped image of the electronic book reader screen; and rendering the enhanced image of the electronic book reader screen via an output image device.

DETAILED DESCRIPTION

Aspects of the exemplary embodiment relate to an image processing system such as multifunction device (MFD), which includes operational components that allow a user to copy pages from an e-reader, among other things. The MFD may be an image rendering device in which the operations may include two or more of printing, copying, faxing, scanning, scan to email, and the like. Each of the operations may be user-selectable via an appropriate local user interface (UI) located proximate the MFD, which allows contemporaneous user interaction with the MFD by respective users.

As used herein, the term "data" refers generally to physical signals that indicate or include information. The terms "image" and "page," as used herein, refer to any image containing any, or all, of one or more halftone images, continuous tone images, line art or other graphics images, and/or any compilation of text, that is capable of being displayed on a display device or output on an image bearing substrate. For example, an image may be a combination of graphics and text that is stored in an image input device. The image may be a series of pixel values denoting the color, intensity, and/or any other known or later developed image property of the particular pixels that make up the image.

Each location in an image may be called a "pixel." Each pixel has certain pixel values associated with it. Each pixel value is a bit in a "binary form" of an image, or a gray scale value in a "gray-scale form" of an image, or a set of color space coordinates in a "color-coordinate form" of an image. The binary form, gray-scale form, and color-coordinate forms are each a two-dimensional array defining an image. An image can be digital, where the various forms of pixel values (i.e., bit, gray scale value, etc.) are numerical values, or an image can be physical, such as colorants printed on a page, where pixel values are amounts of colorants at respective pixel locations. An operation typically performs "image processing" when it operates on an item of data that relates to part of an image.

Figure 1:
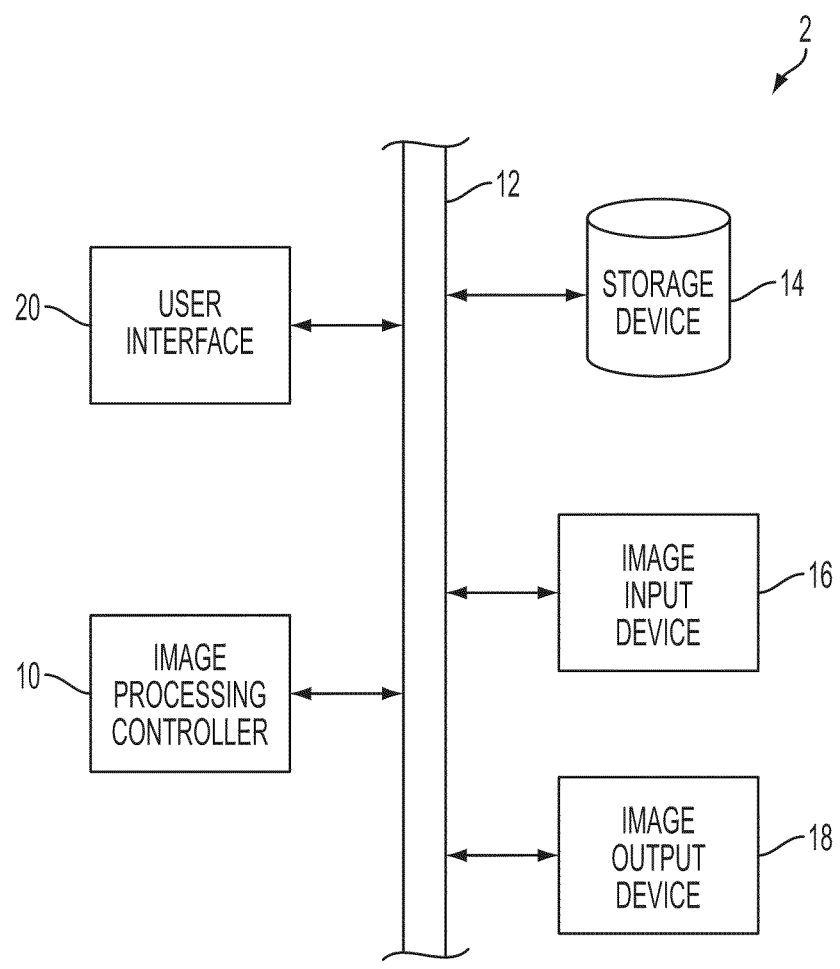
FIG. 1 is a block diagram of an image processing system suitable for implementing aspects of the exemplary embodiments.

FIG. 1 illustrates a block diagram of an exemplary environment in which a multi-function device (MFD) 2 in accordance with the exemplary embodiment operates. Exemplary operations include image processing operations, such as scanning, copying, faxing, and printing. Image processing operations generally involve the processing of jobs, such as print jobs, copy jobs, or fax jobs. In addition, the MFD 2 includes an e-reader mode (auto and/or manual selection), as described more fully below.

As shown in FIG. 1, an image processing controller 10 is connected via a communication connection (wired or wireless) 12 to a document storage device (or memory) 14. The image processing controller 10 may also be associated with an image input device 16. An "image input device" is a device that can receive an image and provide an item of data defining a version of the image. A "scanner" is a type of image input device that receives an image by a scanning operation, such as by scanning a document.

The image processing controller 10 may be associated with an image data output device 18. An "image output device" is a device that can receive an item of data defining an image and provide or render the image as output, such as a printer. Further, a "display" is a type of image output device that provides the output age in human viewable form.

The image processing controller 10 may be hosted by the MFD's control system (not shown), often referred to as a digital front end (DFE). The image processing controller 10 is capable of receiving the adjusted image data and supplying image data to the image data output device 18. For example, the image processing controller 10 may be a computer, a microprocessor, a scanner processor, a network server, a print server, photocopying device and/or any other known or later developed device or system that is able to receive and provide image data. The image processing controller 10 may include a plurality of components including displays, user interfaces, memory, disk drives, tape drives, hard disks, flash drives, zip drives, CD-ROM drives, DVD drives, and the like.

The image output device 18 is any type of device that is capable of outputting an image. For example, the image output device 18 may be a laser printer, bubble jet printer, ink jet printer, photocopying machine, or any other known or later developed device or system that is able to generate an image on a recording medium or display an image using image data or data generated from the image data. The image output device 18 generates an image based on the adjusted image data from the image processing controller 10. While FIG. 1 shows a single image output device 18, multiple image output devices 18 may be coupled to the image processing controller 10.

It will be appreciated that the UI 20 may be mounted directly on the MFD 2 or proximate thereto in any convenient location to be accessed by walk up users of the MFD 2. The UI 20 may be manually operable for entering user selections. For example, the UI 20 may each include a display, such as a LCD display, and a user input device, such as a touch screen, keyboard, or the like, by which a user inputs a selection.

The image input device 16 performs a scanning function and may be used in performing operations such as scanning, copying and faxing. In particular, the image input device 16 acquires a digital image of an original hardcopy document, which image may be stored and optionally further processed by other operational components of the MFD 2. A copying operation may be performed by a combination of scanning and printing operations.

As will be appreciated, other operational components of the MFD, which are not illustrated in FIG. 1 for convenience, may include a print media source, such as a high speed paper feeder, a finisher which receives printed sheets from the printer, and a print media conveyor system, which conveys the paper from the paper source to the printer and finisher in turn.

The processing steps that will be described herein may take place either on the image processing controller 10 or at a dedicated server or processor associated with the storage device 14. As another alternative, the processing described may take place within the image input device 16, or at the image output device 18, if they are equipped with the appropriate processors. This may well be the case in the situation of a multi-function device, which is equivalent to the computer/scanner/printer combination described herein.

The storage device 14 may represent any type of computer readable medium such as random access memory (RAM), read only memory (ROM), magnetic disk or tape, optical disk, flash memory, or holographic memory. In one embodiment, the storage device 14 comprises a combination of random access memory and read only memory. In some embodiments, the processing component 10 and the storage device 14 may be combined in a single chip.

Figure 2:
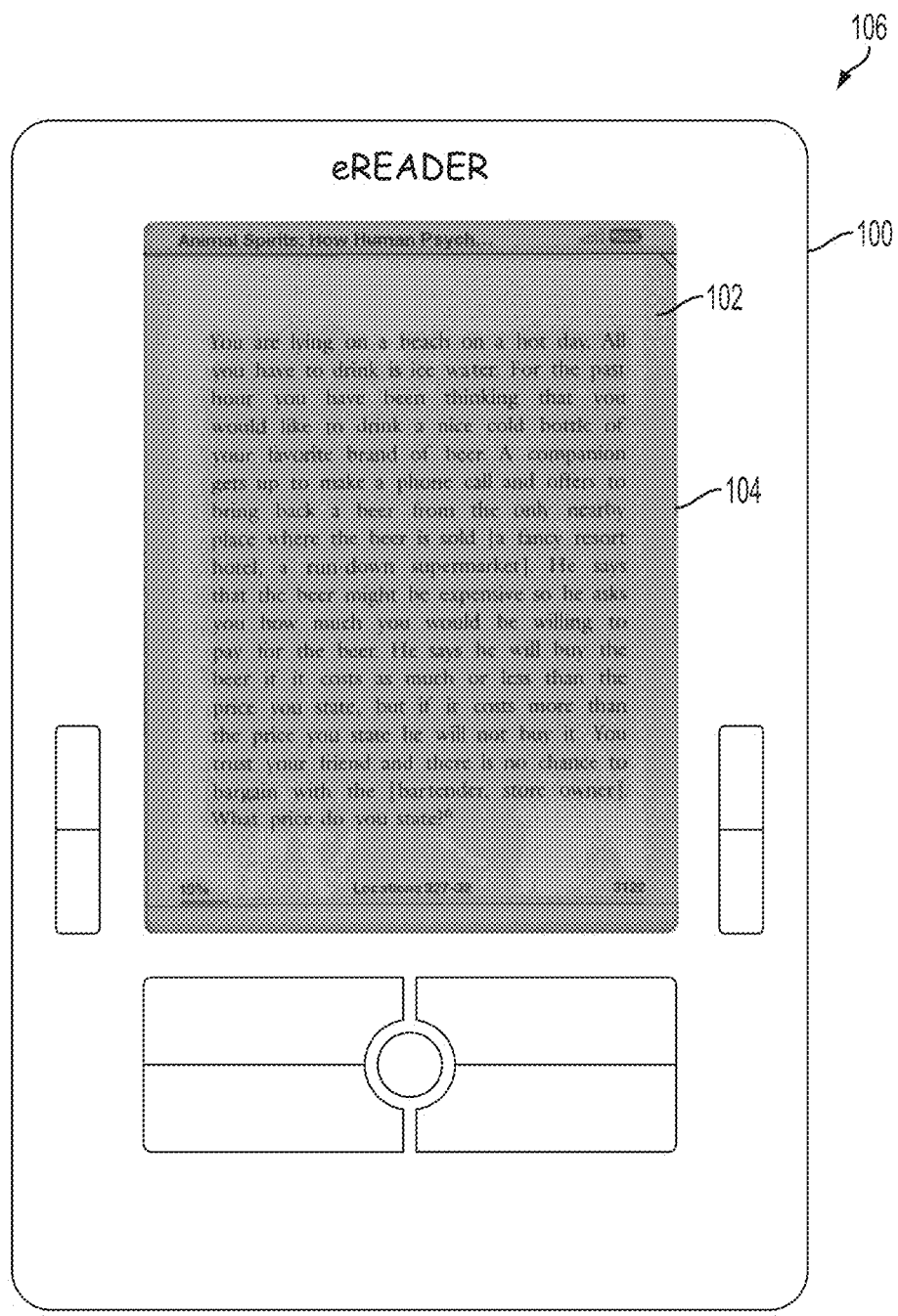
FIG. 2 is a scanned electronic book reader (or e-reader) image (text) using an image processing system without an e-reader mode.

With reference to FIG. 2, an input image 100 obtained by direct copying of an e-reader with an MFD without an e-reader mode is illustrated. While the image is generally readable, there are a few aspects that can be significantly improved. First, the background 102 of the screen 104 appears to be gray. This is due to the fact that the screen background is not as bright as white paper. As a result, the image contrast, particularly the text contrast, is significantly compromised. Second, the screen of the e-book reader occupies only a portion of the entire page 106 (sometimes only a small portion of a page if a small screen is used). This is a waste of paper and toner. Third, as the imaging surface of the e-book reader is generally not exactly on the scanning surface, scanning could be out-of-focus and the images may appear blurred. The degree of blurring varies for different scanner optics, and the text is generally more sensitive to blurring.

Figure 3:
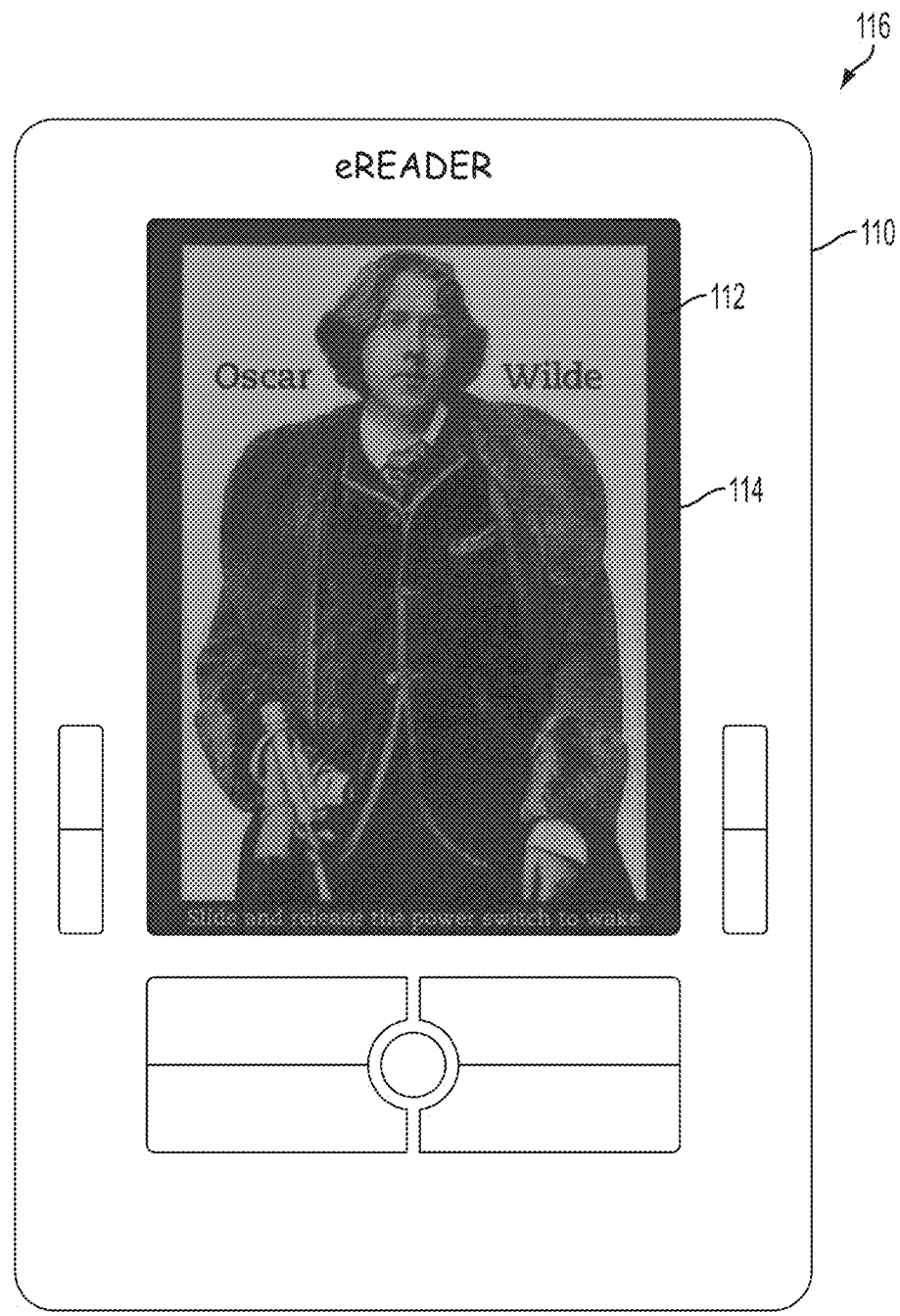
FIG. 3 is a scanned e-reader image (picture) using an image processing system without an e-reader mode.

With reference to FIG. 3, an additional input image 110 obtained by direct copying of an e-reader by a MFD without an e-reader mode is illustrated. Once again, while the image is generally readable, there are a few aspects that can be significantly improved. As before, the background 112 of the screen 114 appears to be gray, and the screen of the e-book reader occupies only a portion of the page 116 (sometimes only a small portion of a page if a small screen is used).

The processing of images with e-reader originals may be improved by introducing an "e-reader" mode to the MFD 2. This new mode of operation for the MFD 2 can be activated by a user from the MFD user interface (UI) 20, or automatically detected by the image processing controller 10 if the mode is set to "auto." Once in "e-reader" mode, the image processing controller 10 automatically (a) locates the area corresponding to the e-reader screen, (b) crops it, (c) de-skews it when necessary, and (d) enhances the image. In addition, N-Up printing (i.e., printing several pages of content on one physical page) may be applied if users desire. During image enhancement, background color is adjusted, contrast is boosted, and the image is de-blurred when necessary.

Two embodiments of image enhancement are presented. The first embodiment performs Tone Reproduction Curve (TRC) adjustment and possible de-blurring on the entire screen area. The second embodiment segments the screen area into three kinds of objects (text/picture/background). Different TRCs are then applied to enhance the objects. Compared with the first embodiment, the second one is more complex. However, it generally provides a better image quality. The text looks darker and sharper.

E-Reader Screen Detection

Figure 4:
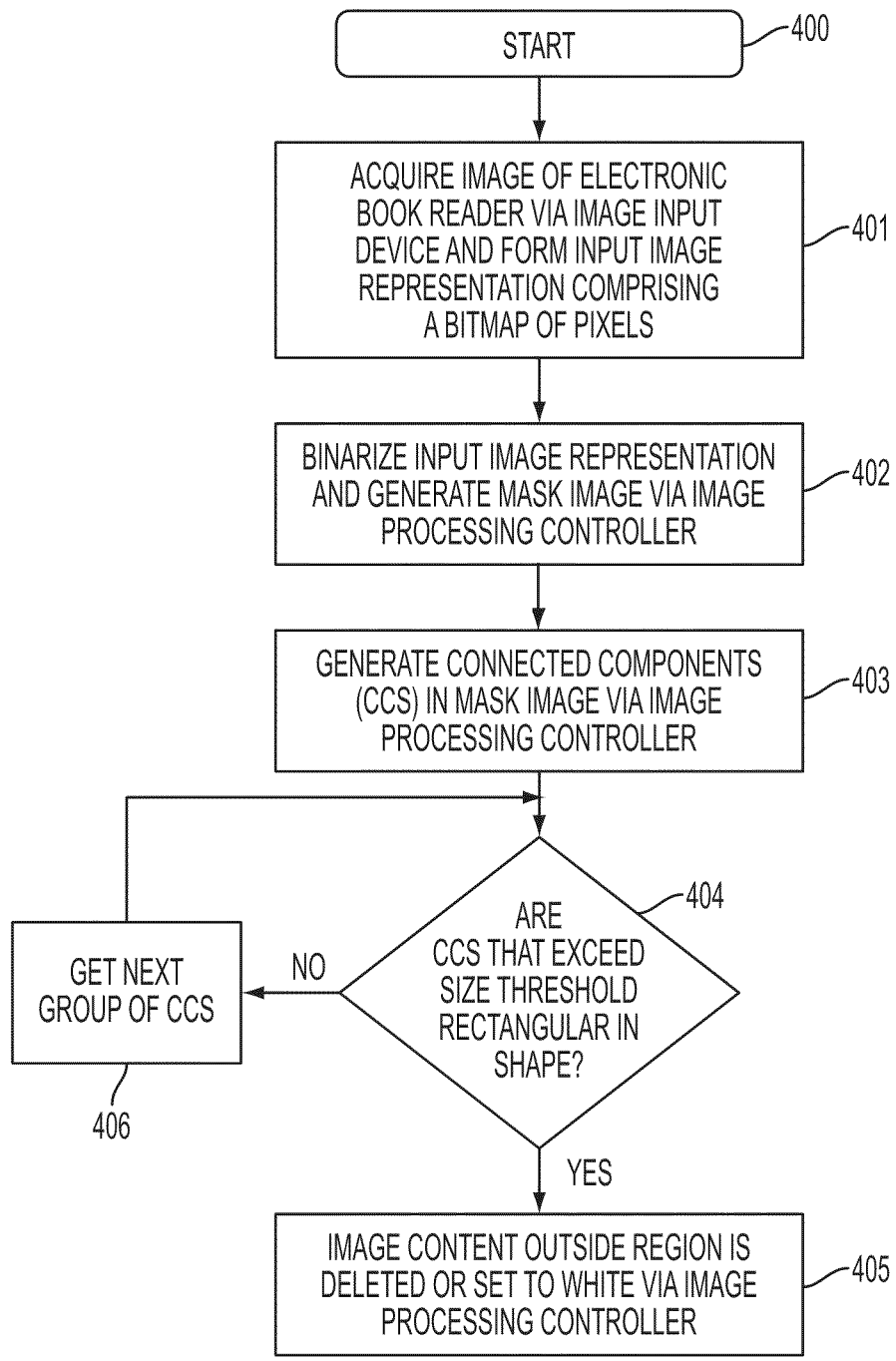
FIG. 4 is a flowchart of an exemplary e-reader image detection method.

Having described an exemplary system for processing documents, exemplary methods that may be performed with the exemplary system will now be described. In the auto mode, the image processing controller 10 automatically determines whether the original on the scanning platen is an e-reader. As the screen of an e-reader is typically gray in color and rectangular in shape (ignoring the corners that are rounded), the detection can be performed from the input image. FIG. 4 illustrates steps in an exemplary method for e-reader recognition. It is to be appreciated that the method may include fewer, more or different steps from those illustrated and need to proceed in the order illustrated. Briefly, the method proceeds as follows.

The e-reader image detection method begins at 400. Initially, the image input device 16 is used to acquire an input image of the e-reader (such as by scanning the e-reader) and thus form an input image representation thereof comprising a bitmap of pixels (401).

Next, the input image representation may be subjected to one or more pre-processing steps, after which the input image representation is binarized (i.e., converted to binary data) to generate an image mask (402) in which $$b(m,n)=1, \text{if } |c(m,n)|<tc \text{ and } y(m,n)<t$$

$$=0, \text{otherwise} \qquad (1)$$

where b(m, n) is the mask value for the input pixel (m,n), y(m,n) is the luminance part of the input pixel, and |c(m, n)| is the norm of the chrominance part of the input pixel, respectively. Tc and t are two pre-set thresholds. Without loss of generality, it may be assumed that a smaller y(m,n) represents a darker pixel. Note that binarization is generally performed using optical character recognition (OCR) techniques and/or other document analysis systems.

Connected components (or CCs) (i.e., groups of contiguous pixels having a common binary value of 1) are then generated in the mask image for pixels that have a value of 1 (403). The CCs that exceed a size threshold are further tested to see if they are generally rectangular in shape (404). There are many existing methods which can accomplish that. One such method is first locating four dominant points in the CC boundary (corresponding to four corners of the rectangle), segmenting the boundary into four pieces using the dominant points, and fitting each boundary segment with a straight line. A rectangle is declared to be detected if the fitting error is within a pre-set range and the resulting four straight lines constitute a rectangle. Since the e-reader products in the market may have only a limited number of different screen sizes (e.g., 6", 8.1", 9.7", etc.), a further check in rectangle size may reduce false positive errors.

The same algorithm can also be used to automatically determine the e-reader screen location, if the "e-reader" mode is activated by a user through the UI. More specifically, the image is first binarized, the connected components (CCs) of the dark pixels are generated, and the CCs are tested for their sizes and shapes.

If the CCs pass all the tests, the region covered is considered to be an e-reader screen, and the image content outside the region is deleted (or set to white) (405).

On the other hand, if the CCs do not pass all the tests, then get the next group of CCs (406). The process is repeated until there are no more CCs.

Image Enhancement

Once the e-reader has been detected and the image content outside the region is deleted, image enhancement may be performed.

Figure 5:
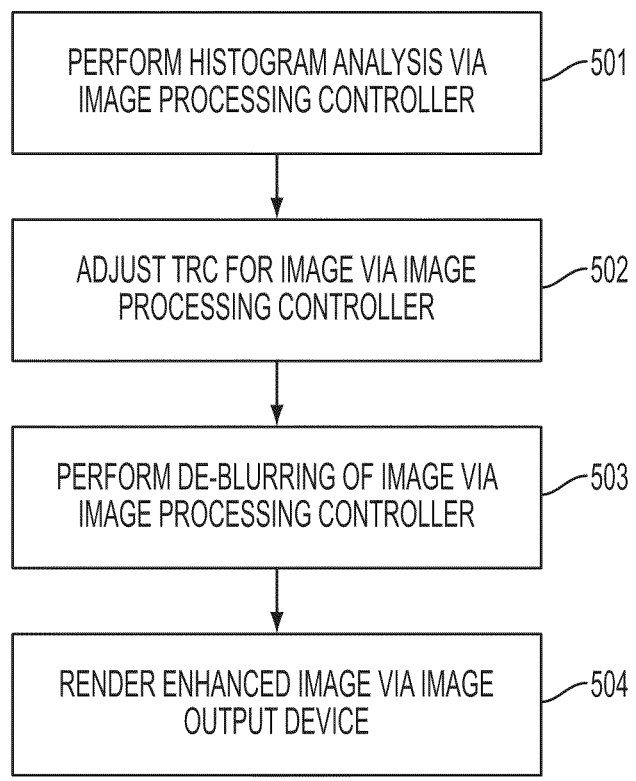
FIG. 5 is a flowchart of a first embodiment of an exemplary e-reader image enhancement method.
Figure 6:
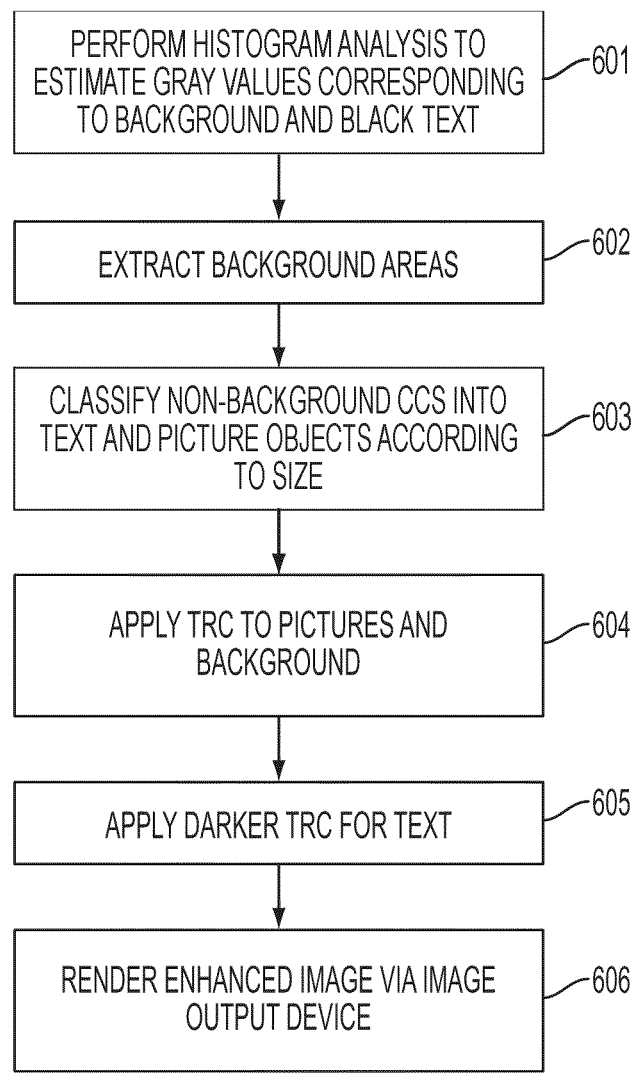
FIG. 6 is a flowchart of a second embodiment of an exemplary e-reader image enhancement method.

FIGS. 5 and 6 illustrate steps in two exemplary methods for image enhancement. It is to be appreciated that each method may include fewer, more or different steps from those illustrated and need to proceed in the order illustrated. Briefly, the methods proceed as follows.

Figure 11:
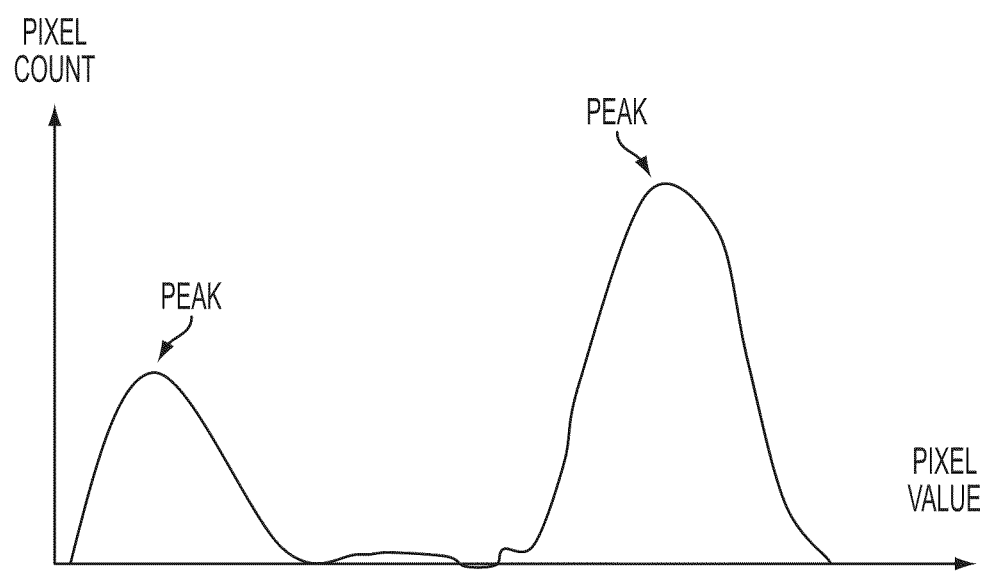
FIG. 11 is a graph showing two peaks close to both ends of a histogram in accordance with aspects of the exemplary embodiment.

In the first embodiment for image enhancement (FIG. 5), once the e-reader screen region has been identified, a histogram analysis is performed (i.e., a graphical display of tabulated frequencies shown as bars) in the screen area to determine the parameters used in TRC adjustment (501). In particular, the gray values that correspond to the background and the black text are estimated. This can be accomplished by locating the two peaks close to both ends of the histogram. See FIG. 11.

Next, the TRC is adjusted such that: (a) the background becomes generally white; (b) the gray value for black text remains unchanged, or becomes slightly darker; and (c) the rest of the values are interpolated with a smoothing function (i.e., Equation (2) described below) (502).

A suitable TRC may be as follows (the gray values are scaled to [0, 1]);

$$g'=g, \text{if } g<B$$

$$g'=(g-B)(1-B)/(W-B)+B, \text{if } g\geq B \quad (2)$$

where g and g' are the TRC input and output gray values, and W and B are the estimated gray values that correspond to the screen background and the black text.

De-blurring, if necessary, can be accomplished by many existing methods (503). See, for example, "Deblurring Images: Matrices, Spectra, and Filtering" by per Christian Hansen, James G. Nagy, and Dianne P. O'Leary, published by SIAM (2006).

Finally, the enhanced image is rendered (i.e., printed or displayed) via the output image device 18 (504).

In the second embodiment for image enhancement (FIG. 6), initially, the image in the screen region is segmented into text and picture objects. Segmentation enables different processing optimized according to the object types. In particular, a separated TRC can be applied to the text objects to make them darker. This also sharpens the text and additional de-blurring becomes unnecessary.

A histogram analysis is first performed to estimate the gray values that correspond to the background and the black text (601) in a similar manner as in step (501). The background areas are then extracted, i.e., those pixels that have values that are very close to the estimated background value (602). The "estimated background value" is determined in a similar manner as in step (501). The connected components that are grouped by the non-background pixels are classified into text and picture objects according to their sizes (small objects text and large objects picture) (603). These CCs are composed of non-background pixels. The TRC specified in Equation (2) is then applied to pictures and background (604).

For text, a "darker" TRC is used (605). For example:

$$g'=(g-B)(1-B)/(W-B) \quad (3)$$

where g and g' are the TRC input and output gray values, W and B are the estimated gray values that correspond to the screen background and the black text.

Finally, the enhanced image is rendered (i.e., printed or displayed) via the output image device 18 (606).

Figure 8:
FIG. 8 is an enhanced e-reader image (picture) using an image processing system with an e-reader mode according to a first embodiment of an exemplary e-reader image enhancement method.
Figure 7:
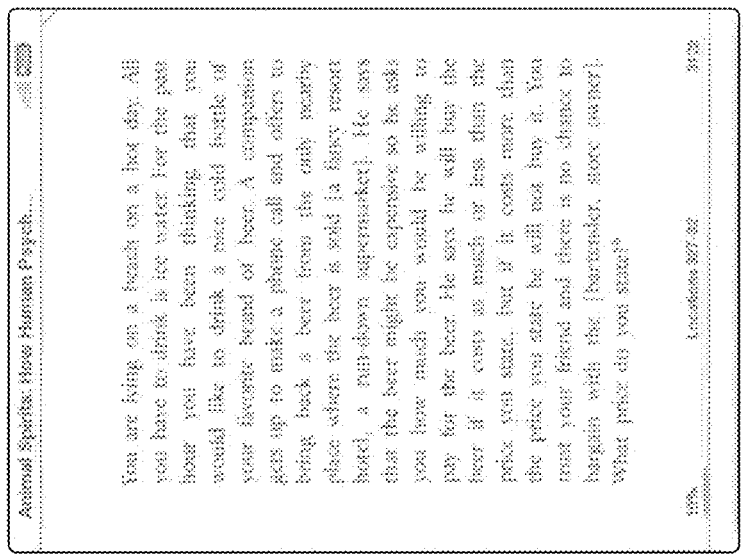
FIG. 7 is an enhanced e-reader image (text) using an image processing system with an e-reader mode according to a first embodiment of an exemplary e-reader image enhancement method.
Figure 10:
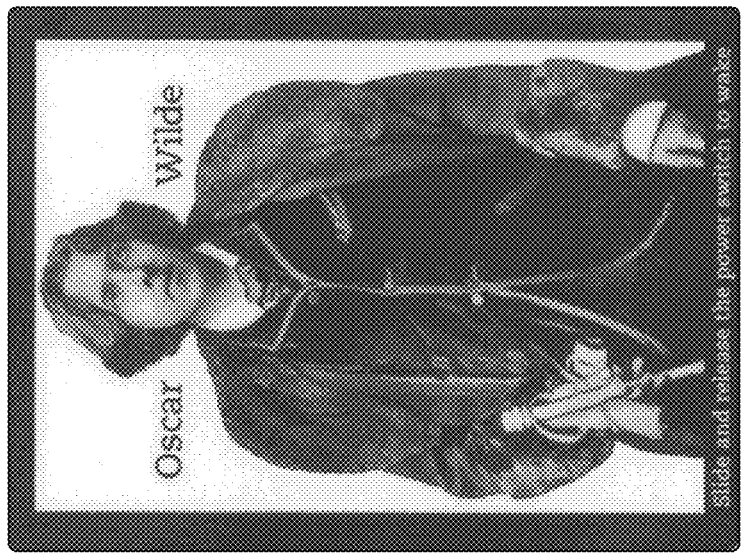
FIG. 10 is an enhanced e-reader image (picture) using an image processing system with an e-reader mode according to a second embodiment of an exemplary e-reader image enhancement method.
Figure 9:
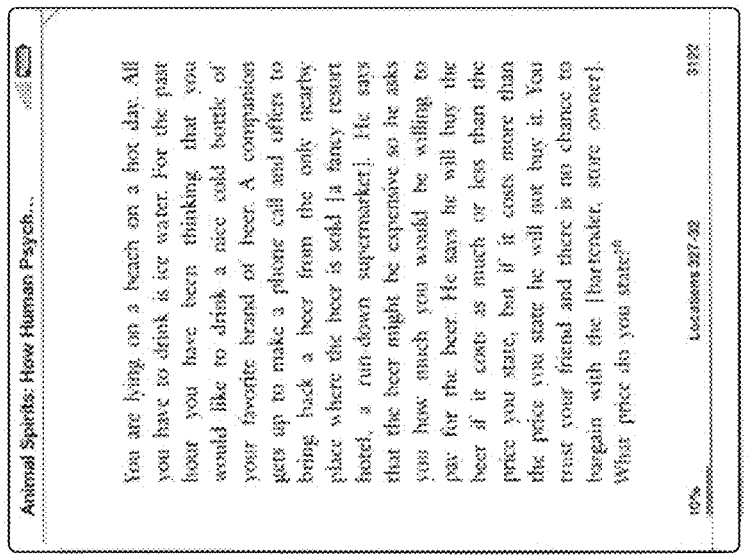
FIG. 9 is an enhanced e-reader image (text) using an image processing system with an e-reader mode according to a second embodiment of an exemplary e-reader image enhancement method.

Experimental results are shown in two sets of images. FIGS. 2 and 3 are the scanned e-reader images, one is text only (FIG. 2) and the other is dominated by a picture (FIG. 3). The processing results are given in FIGS. 7 and 8 with the first embodiment of image enhancement, and in FIGS. 9 and 10 using the second embodiment of image enhancement. The e-reader areas have been correctly identified and automatically cropped and de-skewed. In both enhancement embodiments, the tone for the background has been adjusted to the paper white. FIGS. 8 and 10 are similar—both retain enough gray levels for the pictures. FIG. 9 shows more aggressive text contrast enhancement than FIG. 7. Text appears much darker and sharper.

The methods illustrated in FIGS. 4-6 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is, in turn, capable of implementing the flowcharts shown in FIGS. 4-6, can be used to implement the method for operating an MED.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of processing images from an electronic book reader with an image processing system, the method comprising:
    acquiring an input image from an electronic book reader screen via an image input device;
    forming an input image representation of the electronic book reader screen comprising a bitmap of pixels via an image processing controller;
    detecting an electronic book reader screen in the input image representation, wherein a region defining the electronic book reader screen is determined by binarizing the input image representation to generate an image mask and generating connected components in the binarized mask image for pixels with a common binary value, wherein the input image representation is binarized to generate an image mask in which $$b(m,n)=1, \text{if } |c(m,n)|<tc \text{ and } y(m,n)<t$$
    $$=0, \text{otherwise}$$

where b(m, n) is the mask value for the input pixel (m,n), y(m,n) is the luminance part of the input pixel, |c(m, n)| is the norm of the chrominance part of the input pixel, and Tc and t are pre-set thresholds;
    cropping the input image representation, whereby image content outside the region defining the electronic book reader screen is deleted or set to white;
    enhancing the cropped image of the electronic book reader screen; and
    rendering the enhanced image of the electronic book reader screen via an output image device.

2. The method of claim 1, wherein the common binary value is 1.

3. The method of claim 1, wherein the enhancement of the cropped image of the electronic book reader screen further comprises:
    performing a histogram analysis on the cropped image;

adjusting a tone reproduction curve to generate an enhanced image.

4. The method of claim 1, wherein the enhancement of the cropped image of the electronic book reader screen further comprises:
segmenting the cropped image into text and pictures.

5. The method of claim 1, wherein the enhancement of the cropped image of the electronic book reader screen further comprises:
performing a histogram analysis on the segmented image to estimate gray values corresponding to background and text;
extracting background areas from the segmented image;
classifying non-background connected components into text and picture objects according to size;
applying an adjusted tone reproduction curve for the background and picture objects;
applying a darker tone reproduction curve for text objects.

6. A system for processing images from an electronic book reader, the system comprising:
an image input device that acquires an input image from an electronic book reader screen;
an image processing controller that forms an input image representation of the electronic book reader screen comprising a bitmap of pixels, detects an electronic book reader screen in the input image representation, wherein a region defining the electronic book reader screen is determined by binarizing the input image representation to generate an image mask and generating connected components in the binarized mask image for pixels with a common binary value, crops the input image representation, whereby image content outside the region defining the electronic book reader screen is deleted or set to white, and enhances the cropped image of the electronic book reader screen, wherein the image processing controller is operative to binarize the input image representation to generate an image mask in which $$b(m,n)=1, \text{if } |c(m,n)|<tc \text{ and } y(m,n)<t$$
$$=0, \text{otherwise}$$

where b(m, n) is the mask value for the input pixel (m,n), y(m,n) is the luminance part of the input pixel, |c(m, n)| is the norm of the chrominance part of the input pixel, and Tc and t are pre-set thresholds; and
an output image device that renders the enhanced image of the electronic book reader screen.

7. The system of claim 6, wherein the common binary value is 1.

8. The system of claim 6, wherein the image processing controller is operative to enhance the cropped image of the electronic book reader screen by:
performing a histogram analysis on the cropped image;
adjusting a tone reproduction curve to generate an enhanced image.

9. The system of claim 6, wherein the image processing controller is operative to enhance the cropped image of the electronic book reader screen by:
segmenting the cropped image into text and pictures.

10. The system of claim 6, wherein the image processing controller is operative to enhance the cropped image of the electronic book reader screen by:
performing a histogram analysis on the segmented image to estimate gray values corresponding to background and text;
extracting background areas from the segmented image;
classifying non-background connected components into text and picture objects according to size;
applying an adjusted tone reproduction curve for the background and picture objects;
applying a darker tone reproduction curve for text objects.

11. A non-transitory computer-usable data carrier storing instructions that, when executed by a computer, cause the computer to perform a method comprising:
acquiring an input image from an electronic book reader screen via an image input device;
forming an input image representation of the electronic book reader screen comprising a bitmap of pixels via an image processing controller;
detecting an electronic book reader screen in the input image representation, wherein a region defining the electronic book reader screen is determined by, binarizing the input image representation to generate an image mask and generating connected components in the binarized mask image for pixels with a common binary value, wherein the input image representation is binarized to generate an image mask in which $$b(m,n)=1, \text{if } |c(m,n)|<tc \text{ and } y(m,n)<t$$
$$=0, \text{otherwise}$$

where b(m, n) is the mask value for the input pixel (m,n), y(m,n) is the luminance part of the input pixel, |c(m, n)| is the norm of the chrominance part of the input pixel, and Tc and t are pre-set thresholds;
cropping the input image representation, whereby image content outside the region defining the electronic book reader screen is deleted or set to white;
enhancing the cropped image of the electronic book reader screen; and
rendering the enhanced image of the electronic book reader screen via an output image device.

12. The computer-usable data carrier of claim 11, wherein the detection of the electronic book reader screen in the input image representation further comprises:
binarizing the input image representation to generate an image mask; and
generating connected components in the binarized mask image for with a value of 1.

13. The computer-usable data carrier of claim 11, wherein the enhancement of the cropped image of the electronic book reader screen further comprises:
performing a histogram analysis on the cropped image;
adjusting a tone reproduction curve to generate an enhanced image.

14. The computer-usable data carrier of claim 11, wherein the enhancement of the cropped image of the electronic book reader screen further comprises:
segmenting the cropped image into text and pictures.

15. The computer-usable data carrier of claim 11, wherein the enhancement of the cropped image of the electronic book reader screen further comprises:
performing a histogram analysis on the segmented image to estimate gray values corresponding to background and text;
extracting background areas from the segmented image;
classifying non-background connected components into text and picture objects according to size;
applying an adjusted tone reproduction curve for the background and picture objects;
applying a darker tone reproduction curve for text objects.

* * * * *